(12) United States Patent
Park et al.

(10) Patent No.: US 9,821,816 B2
(45) Date of Patent: Nov. 21, 2017

(54) CONTROL METHOD FOR DRIVING OF VEHICLE FOR FAIL-SAFE

(71) Applicant: HYUNDAI MOTOR COMPANY, Seoul (KR)

(72) Inventors: Dae Ro Park, Hwaseong-si (KR); Jin Woo Cho, Uiwang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 107 days.

(21) Appl. No.: 15/054,905

(22) Filed: Feb. 26, 2016

(65) Prior Publication Data

US 2017/0101109 A1 Apr. 13, 2017

(30) Foreign Application Priority Data

Oct. 13, 2015 (KR) ........................ 10-2015-0142631

(51) Int. Cl.
| | | |
|---|---|---|
| B60W 10/10 | (2012.01) | |
| B60W 50/02 | (2012.01) | |
| B60W 10/06 | (2006.01) | |
| B60W 30/18 | (2012.01) | |

(52) U.S. Cl.
CPC ........ B60W 50/0205 (2013.01); B60W 10/06 (2013.01); B60W 10/10 (2013.01); B60W 30/18054 (2013.01); B60W 30/18063 (2013.01); B60W 2710/0666 (2013.01); Y10T 477/68 (2015.01)

(58) Field of Classification Search
CPC . Y10T 477/68; B60W 50/0205; B60W 10/10; B60W 10/06; B60W 2710/0666; B60W 30/18054; B60W 30/18063

USPC ............................................................ 701/63
See application file for complete search history.

(56) References Cited

U.S. PATENT DOCUMENTS

| | | | | |
|---|---|---|---|---|
| 5,941,922 A | * | 8/1999 | Price ....................... | F16H 63/42 340/439 |
| 6,067,492 A | * | 5/2000 | Tabata .................... | F16H 59/08 477/906 |
| 2005/0209047 A1 | * | 9/2005 | Berger ................. | B60K 31/042 477/121 |

(Continued)

FOREIGN PATENT DOCUMENTS

| | | |
|---|---|---|
| JP | 2007-10055 A | 1/2007 |
| JP | 2009-108922 A | 5/2009 |

(Continued)

*Primary Examiner* — Roger L Pang
(74) *Attorney, Agent, or Firm* — Brinks Gilson & Lione

(57) ABSTRACT

A control method for driving of a vehicle for fail-safe, including: determining, by a controller, whether an interface apparatus selecting a shift range fails; confirming, by the controller, the shift range selected upon the failure determination; determining whether the vehicle is in a parking state when the shift range selected upon the failure determination is out of a D range; as a result of performing the determining of the parking, when the vehicle is in the parking state, guiding, by the controller, a driver to step on an accelerator pedal for forward driving of the vehicle; and after the guiding of the driving, when a manipulated quantity of an accelerator pedal is detected, limiting, by the controller, a torque to reduce an output torque value of the vehicle depending on the manipulated quantity of the accelerator pedal for a predetermined reference time.

7 Claims, 4 Drawing Sheets

(56) References Cited

U.S. PATENT DOCUMENTS

2006/0240945 A1    10/2006  Tanaka et al.
2012/0150406 A1*    6/2012  Tomura ................. B60W 10/06
                                                               701/70
2014/0336864 A1*   11/2014  Yoshida ............ B60W 50/0205
                                                              701/29.2

FOREIGN PATENT DOCUMENTS

| JP | 2009-203995 A    | 9/2009 |
| JP | 2010-112524 A    | 5/2010 |
| KR | 10-2011-0036838 A | 4/2011 |
| KR | 10-2013-0064915   | 6/2013 |

* cited by examiner

CONTROL METHOD FOR DRIVING OF VEHICLE FOR FAIL-SAFE

CROSS REFERENCE TO RELATED APPLICATION

The present application claims priority to and the benefit of Korean Patent Application No. 10-2015-0142631, filed on Oct. 13, 2015, which is incorporated herein by reference in its entirety.

FIELD

The present disclosure relates to a control method for driving of a vehicle for fail-safe.

BACKGROUND

The statements in this section merely provide background information related to the present disclosure and may not constitute prior art.

Considering convenience and safety of a driver, vehicles to which an electronic transmission is applied have been developed. The electronic transmission is a shift by wire (SBW) system configured to transfer a driving range manipulation intention of a driver as an electrical signal to a transmission and may smartly convert a shift range unlike the exiting mechanical transmission.

For example, the electronic transmission may be automatically converted into a P range by sensing opening of a vehicle door even though the vehicle door is open in the driving range due to driver's carelessness.

For reference, the driving range means P, R, N, and D ranges of the existing transmission.

In the case of the electronic transmission as described above, there is a button type electronic transmission including buttons capable of selecting each shift range, as an interface apparatus by which the driver may select the driving range. In this case, the driver may not smoothly perform the shift range selection when there is abnormality in the interface apparatus.

SUMMARY

The present disclosure provides a control method for driving of a vehicle for fail-safe capable of normally and stably driving the vehicle when there is abnormality in an interface apparatus receiving a shift range selection of a driver to transfer an electrical signal to a transmission.

According to one embodiment of the present disclosure, there is provided a control method for driving of a vehicle for fail-safe, including: a failure determining step of determining, by a controller, whether an interface apparatus selecting a shift range fails; a confirming step of confirming, by the controller, the shift range selected when the failure of the interface apparatus is determined; a parking determining step to determine whether the vehicle is in a parking state when the shift range selected upon the failure determination is out of a D range; as a result of performing the parking determining step, when the vehicle is in the parking state, a guiding step of guiding, by the controller, a driver to step on an accelerator pedal for forward driving of the vehicle; and after the guiding step, when a manipulated quantity of an accelerator pedal is detected, a torque limiting step of reducing, by the controller, an output torque value of the vehicle depending on the manipulated quantity of the accelerator pedal for a predetermined reference time.

In the failure determining step, it may be determined that a portion of the interface apparatus selecting the D range fails. For example, the portion may be a button, an electric circuit or anything else being used to receive driver's manipulation to select or change shift ranges.

In the torque limiting step, an output torque value of the vehicle depending on the manipulated quantity of the accelerator pedal may be reduced and a reduced quantity of the output torque may be continuously reduced from 100% of an output torque for a reference time from a manipulation starting time of the accelerator pedal and thus the reduced quantity of the output torque may be controlled to be 0% after the reference time lapses.

In the torque limiting step, a change slope of the reduced quantity of the output torque for the reference time from the manipulation starting timing of the accelerator pedal may be controlled to be changed depending on a change rate of the manipulated quantity of the accelerator pedal.

In the torque limiting step, as the change rate of the manipulated quantity of the accelerator pedal for the reference time from the manipulation starting timing of the accelerator pedal is increased, the change slope of the reduced quantity of the output torque may be set to be reduced.

The control method for driving of a vehicle for fail-safe may further include a check guiding step of guiding a failure check when the failure of the interface apparatus is determined in the failure determining step.

The output torque of the vehicle may be normally controlled independent of the failure of the interface apparatus when the confirming step determines that the shift range selected is the D range.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
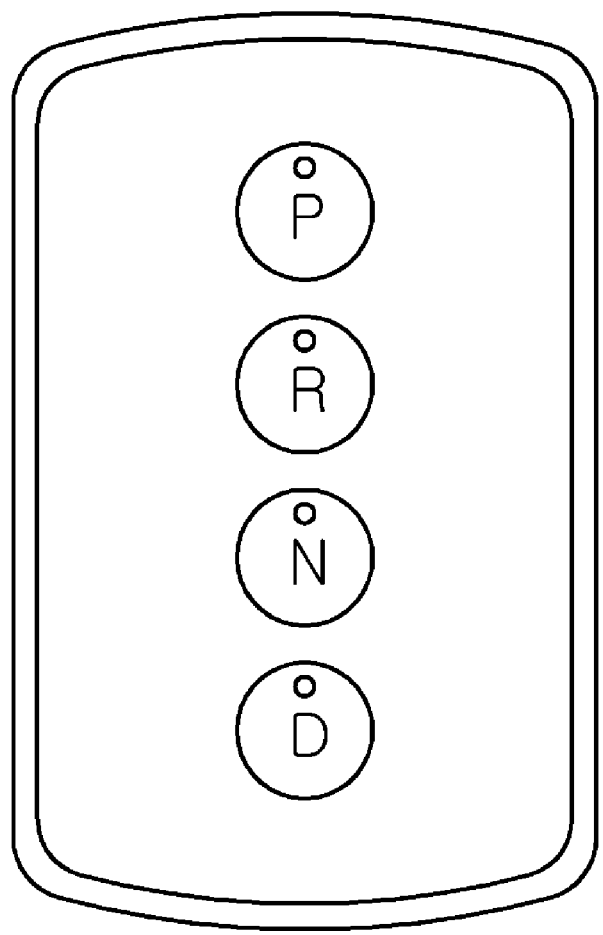
FIG. 1 is a diagram illustrating an example of an interface apparatus selecting a shift range.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
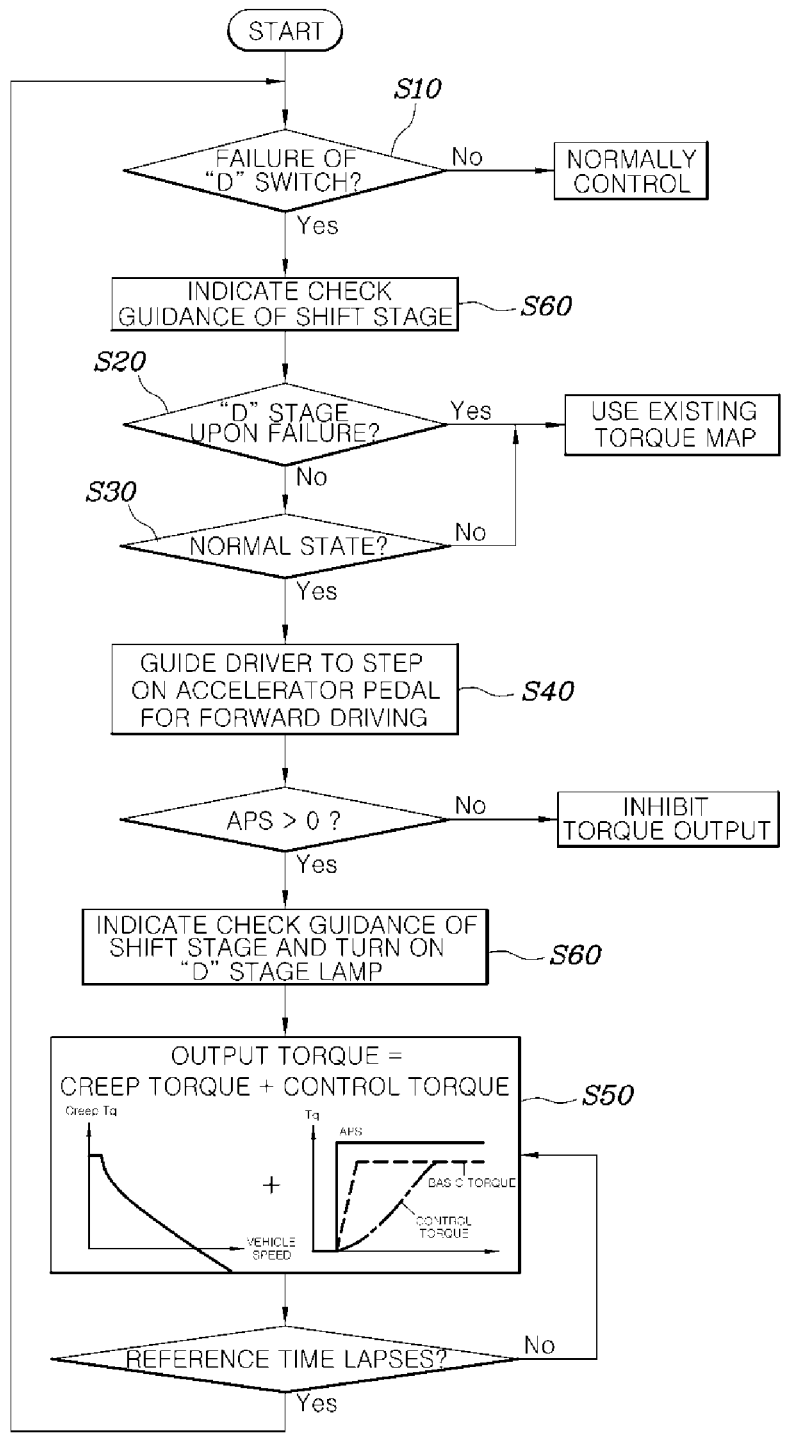
FIG. 2 is a flow chart illustrating a control method for driving of a vehicle for fail-safe.

Referring to FIG. 2, a control method for driving of a vehicle for fail-safe includes a failure determining step of determining, by a controller, whether an interface apparatus selecting a shift range fails (S10); a confirming step of confirming, by the controller, the shift range selected upon the failure determination (S20); a parking determining step to determine whether the vehicle is in a parking state when the shift range selected upon the failure determination is out of a D range (S30); a guiding step in which when the parking determining step determines that the vehicle is in the parking state, the controller guides a driver to step on an accelerator pedal for forward driving of the vehicle (S40); and a torque limiting step of reducing, when a manipulated quantity of an accelerator pedal is detected after the guiding step, by the controller, an output torque value of the vehicle depending on the manipulated quantity of the accelerator pedal for a predetermined reference time (S50).

Here, as the interface apparatus for selecting the shift range, a button type interface apparatus as illustrated in FIG. 1 may be used. The failure determining step determines whether a portion of the interface apparatus which selects the D range fails. For example, the failure of the interface apparatus (e.g., a button of the interface apparatus) is determined if the D range is not selected when a D button is pressed.

In a case where, as a result of performing the failure determining step (S10), it is determined that the D range may not be selected, and the shift range engaged upon the failure determination is not a D range but a P range, an N range, or the like, and also when the vehicle is in the parking state, the driver is guided or notified by a display or sound signals to step on an accelerator pedal to forward drive the vehicle, the vehicle is driven forward according to the accelerator pedal manipulation of the driver, and the output torque value of the vehicle is temporarily reduced to inhibit or prevent the vehicle from suddenly starting at an early stage and secure safety, thereby driving the vehicle forward despite the failure of the interface apparatus and making safe driving of the vehicle.

As a result of performing the confirming of the range (S20), when the shift range selected upon the failure is the D range, the output torque of the vehicle is normally controlled using a torque map used up to now independent of the failure of the interface apparatus. Unlike the torque limiting step (S50), the torque is limited or is not reduced. Instead, the control is performed in the same state as the existing normally controlled state.

This is to secure the reliability of the vehicle by providing the normal driving performance of the vehicle if possible because only the interface apparatus is failure and apparatuses associated with the driving of the vehicle do not fail.

Further, as a result of performing the determining of the parking (S30), even when the vehicle is not in the parking state, the vehicle is normally driven using the torque map in the existing driving state according to the purpose.

Meanwhile, the shift range other than the D range is selected when it is determined that the interface apparatus of selecting the shift range fails and when the vehicle is in the parking state, to forward drive the vehicle if possible according to the driver's needs, the guiding of the driving is performed to guide the driver to step on the accelerator pedal when the forward driving of the vehicle is required.

When the driver steps on the accelerator pedal of the vehicle according to the guidance, the limiting of the torque (S50) is performed. In the torque limiting step (S50), the output torque value of the vehicle depending on the manipulated quantity of the accelerator pedal is reduced and the reduced quantity of the output torque is continuously reduced from 100% of the output torque for a reference time from a manipulation starting time of the accelerator pedal and thus the reduced quantity of the output torque is controlled to be 0% after the reference time lapses.

Figure 3:
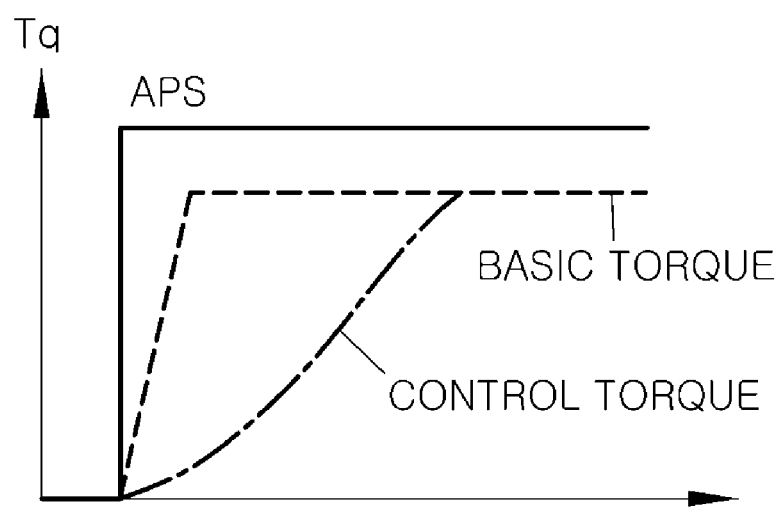
FIG. 3 is a diagram illustrating a torque relationship of a torque limiting step.

That is, in a general case, when an accelerator pedal sensor (APS) signal is increased depending on the accelerator pedal manipulation of the driver, the output torque (basic torque) of the vehicle to be output from the torque map preset to generate the output torque of the vehicle is selected to control power sources of an engine, a motor, etc., of the vehicle. However, in the torque limiting step (S50), as illustrated in FIG. 3, a control torque generated by reducing the basic torque is set to be the output torque of the vehicle for the reference time. In this case, first, the output torque is reduced 100% and thus the control torque starts from 0 and the reduced quantity of the torque is gradually reduced over time, and as a result the control torque is gradually increased to reach the basic torque when the reference time ends. After that, the control is performed depending on the basic torque.

This is to inhibit or prevent the sudden starting of the vehicle that may arise and stably start the vehicle and normally drive the vehicle after a predetermined timing. For this purpose, the reference time may be appropriately selected in design by appropriately controlling between the stable starting performance of the vehicle and the normal driving performance of the vehicle. In one form, the reference time may be set to be several seconds to 30 seconds.

In the torque limiting step (S50), a change slope of the reduced quantity of the output torque for the reference time from the manipulation starting timing of the accelerator pedal may be controlled to be changed depending on a change rate of the manipulated quantity of the accelerator pedal.

For example, as the change rate of the manipulated quantity of the accelerator pedal for the reference time from the manipulation starting timing of the accelerator pedal is increased, the change slope of the reduced quantity of the output torque is set to be reduced.

That is, when the driver suddenly steps on the accelerator pedal, as the change rate of the manipulated quantity of the accelerator pedal is increased, the reduction in the output torque is sustained for a longer period of time to more thoughtfully prepare for the danger of the sudden intended acceleration but on the contrary, the reduced quantity of the output torque is suddenly reduced and thus the output torque is rapidly increased to be closer to the desired output performance of the vehicle, thereby trading off between the stability and the drivability.

If it is determined in the failure determining step (S10) that the interface apparatus fails, a step of guiding a failure check (S60) is performed.

As illustrated in FIG. 2, the guiding of the failure check (S60) may be performed immediately after the determining of the failure and may be simultaneously performed with the limiting of the torque after the driver manipulates the accelerator pedal.

Meanwhile, as illustrated in FIG. 2, a D range lamp may be turned on simultaneously with performing the torque limiting step (S50) to indicate that the vehicle is currently driving in the D range state to the driver even though the driver may not select the D range due to the failure of the interface apparatus to select the D range.

Figure 4:
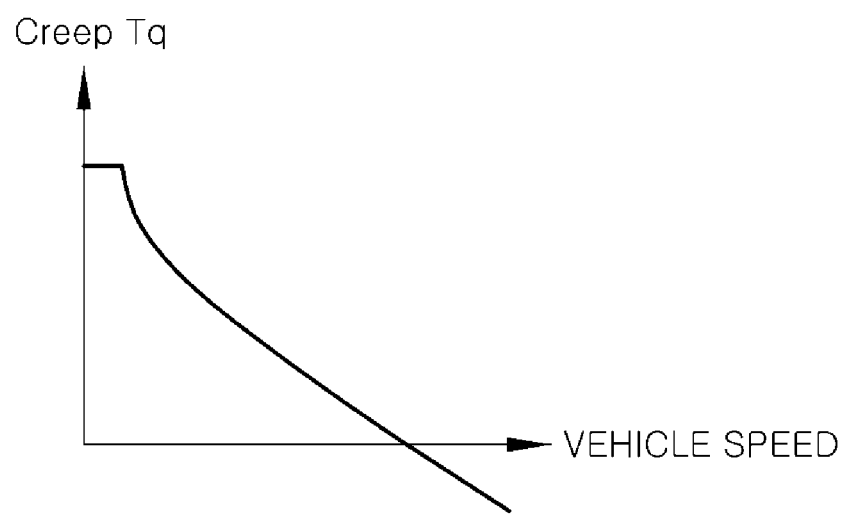
FIG. 4 is a diagram illustrating a graph of a creep torque depending on a vehicle speed.

Meanwhile, when the vehicle is an eco-friendly vehicle which does not use a torque converter and thus needs to artificially generate the creep torque, the torque limiting step (S50) is performed in consideration of the change in the creep torque depending on the vehicle speed as illustrated in FIG. 4. That is, when the driver starts to manipulate the accelerator pedal, a sum of the creep torque and the control torque in the torque limiting step (S50) is set to be as the output torque of the vehicle and after the reference time lapses, a sum of the creep torque and the basic torque becomes the output torque of the vehicle.

For reference, FIG. 2 illustrates an example of the eco-friendly vehicle described above.

It is possible to secure the fail-safe performance of the vehicle by normally and stably driving the vehicle if possible when there is abnormality in the interface apparatus receiving the shift range selection of the driver to transfer the electrical signal to the transmission.

Although the present disclosure has been shown and described with respect to specific exemplary embodiments, it will be obvious to those skilled in the art that the present disclosure may be variously modified and altered without departing from the spirit and scope of the present disclosure.

What is claimed is:

1. A control method for driving of a vehicle for fail-safe, comprising:
   a failure determining step of determining, by a controller, whether an interface apparatus selecting a shift range fails;
   a confirming step of confirming, by the controller, the shift range selected when the failure of the interface apparatus is determined;
   a parking determining step to determine whether the vehicle is in a parking state when the shift range selected is out of a D range;
   a guiding step in which when the parking determining step determines that the vehicle is in the parking state, the controller guides a driver to step on an accelerator pedal for forward driving of the vehicle; and
   a torque limiting step of reducing, when a manipulated quantity of the accelerator pedal is detected after the guiding step, by the controller, an output torque value of the vehicle depending on the manipulated quantity of the accelerator pedal for a predetermined reference time.

2. The control method of claim 1, wherein the failure determining step determines that a portion of the interface apparatus configured to select the D range fails.

3. The control method of claim 1, wherein in the torque limiting step, the output torque value of the vehicle is reduced, and a reduced quantity of the output torque is continuously reduced from 100% of an output torque for a reference time from a manipulation starting time of the accelerator pedal and thus the reduced quantity of the output torque is controlled to be 0% after the reference time lapses.

4. The control method of claim 3, wherein in the torque limiting step, a change slope of the reduced quantity of the output torque for the reference time from the manipulation starting timing of the accelerator pedal is controlled to be changed depending on a change rate of the manipulated quantity of the accelerator pedal.

5. The control method of claim 4, wherein in the torque limiting step, as the change rate of the manipulated quantity of the accelerator pedal for the reference time from the manipulation starting timing of the accelerator pedal is increased, the change slope of the reduced quantity of the output torque is set to be reduced.

6. The control method of claim 1, further comprising a check guiding step of guiding a failure check when the failure of the interface apparatus is determined in the failure determining step.

7. The control method of claim 1, wherein the output torque of the vehicle is normally controlled independent of the failure of the interface apparatus when the confirming step determines that the shift range selected is the D range.

* * * * *